United States Patent
Ashida et al.

(10) Patent No.: US 11,777,097 B2
(45) Date of Patent: Oct. 3, 2023

(54) BINDER COMPOSITION, MIXTURE FOR PRODUCING ELECTRODE FOR NON-AQUEOUS ELECTROLYTE SECONDARY BATTERY, ELECTRODE FOR NON-AQUEOUS ELECTROLYTE SECONDARY BATTERY, AND NON-AQUEOUS ELECTROLYTE SECONDARY BATTERY

(71) Applicant: Kureha Corporation, Tokyo (JP)

(72) Inventors: Kana Ashida, Tokyo (JP); Kenta Aoki, Tokyo (JP); Yukitaro Sakakibara, Tokyo (JP); Shota Kobayashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 623 days.

(21) Appl. No.: 16/978,885

(22) PCT Filed: Nov. 9, 2018

(86) PCT No.: PCT/JP2018/041761
§ 371 (c)(1),
(2) Date: Sep. 8, 2020

(87) PCT Pub. No.: WO2019/176163
PCT Pub. Date: Sep. 19, 2019

(65) Prior Publication Data
US 2020/0411875 A1 Dec. 31, 2020

(30) Foreign Application Priority Data
Mar. 15, 2018 (JP) .................. 2018-047809

(51) Int. Cl.
| | |
|---|---|
| H01M 4/62 | (2006.01) |
| C08F 214/22 | (2006.01) |
| C08F 259/08 | (2006.01) |
| H01M 4/50 | (2010.01) |
| H01M 4/505 | (2010.01) |
| H01M 4/52 | (2010.01) |
| H01M 4/525 | (2010.01) |
| H01M 10/0525 | (2010.01) |
| H01M 4/02 | (2006.01) |

(52) U.S. Cl.
CPC ......... *H01M 4/623* (2013.01); *C08F 214/225* (2013.01); *C08F 259/08* (2013.01); *H01M 4/502* (2013.01); *H01M 4/505* (2013.01); *H01M 4/523* (2013.01); *H01M 4/525* (2013.01); *H01M 10/0525* (2013.01); *H01M 2004/028* (2013.01)

(58) Field of Classification Search
CPC .. C08F 214/18; C08F 214/225; C08F 220/22; C08F 220/36
See application file for complete search history.

(56) References Cited

U.S. PATENT DOCUMENTS

| | | |
|---|---|---|
| 7,553,540 B2 | 6/2009 | Debergalis et al. |
| 8,048,518 B2 | 11/2011 | Debergalis et al. |
| 8,062,744 B2 | 11/2011 | Debergalis et al. |
| 8,197,933 B2 | 6/2012 | Debergalis et al. |
| 9,252,295 B2 | 2/2016 | Nakagawa et al. |
| 2007/0154704 A1 | 7/2007 | Debergalis et al. |
| 2009/0260677 A1 | 10/2009 | Debergalis et al. |
| 2009/0293944 A1 | 12/2009 | Debergalis et al. |
| 2012/0024352 A1 | 2/2012 | Debergalis et al. |
| 2012/0240986 A1 | 9/2012 | Debergalis et al. |
| 2014/0290743 A1 | 10/2014 | Nakagawa et al. |
| 2017/0110733 A1 | 4/2017 | Yoon et al. |
| 2021/0265608 A1* | 8/2021 | Oakes .................. H01M 4/663 |

FOREIGN PATENT DOCUMENTS

| | | |
|---|---|---|
| JP | H07-201315 A | 8/1995 |
| JP | 2000-251897 A | 9/2000 |
| JP | 2003-155313 A | 5/2003 |

(Continued)

OTHER PUBLICATIONS

Office Action dated Nov. 3, 2022, in Chinese Patent Application No. 201880089337.0.
Office Action dated Nov. 24, 2021, in Japanese Patent Application No. 2018-047809.
Korean Notice of Grounds for Rejection for Korean Application No. 10-2020-7027803, dated Apr. 27, 2022, with an English translation.
Extended European Search Report dated Apr. 7, 2021, in European Patent Application No. 18909846.0.
Kyulavska et al., "Unexpected Alternating Radical Copolymerization of Chlorotrifluoroethylene with 3-Isopropenyl-α-α'-dimethylbenzyl Isocyanate," Journal of Polymer Science Part A: Polymer Chemistry (2010), vol. 48, No. 12, pp. 2681-2697.

(Continued)

*Primary Examiner* — Amanda C. Walke
(74) *Attorney, Agent, or Firm* — Birch, Stewart, Kolasch & Birch, LLP

(57) ABSTRACT

The present invention is to provide a binder composition of a non-aqueous electrolyte secondary battery, which contains a vinylidene fluoride polymer and is capable of further enhancing adhesive strength of the electrode mixture layer to a surface of a current collector. The above objective can be achieved by a binder composition of a non-aqueous electrolyte secondary battery, the binder composition comprising a vinylidene fluoride copolymer for a binder of a non-aqueous electrolyte secondary battery, the vinylidene fluoride copolymer containing: a first constituent unit derived from vinylidene fluoride, and a second constituent unit containing an isocyanate group or having a structure that produces an isocyanate group when heated at 200° C. for 1 hour. This binder composition can be used in a mixture for producing an electrode for a non-aqueous electrolyte secondary battery, an electrode for a non-aqueous electrolyte secondary battery, and a non-aqueous electrolyte secondary battery.

8 Claims, No Drawings

(56) References Cited

FOREIGN PATENT DOCUMENTS

| JP | 2009-522414 A | | 6/2009 | |
|----|---------------|---|--------|---|
| JP | 2010-15904 A | | 1/2010 | |
| JP | 2013-117023 A | | 6/2013 | |
| JP | 2017-526104 A | | 9/2017 | |
| JP | 2018-190527 A | | 11/2018 | |
| KR | 2020012514 A | * | 2/2020 | .............. H01M 4/62 |
| WO | WO-2019150909 A1 | * | 8/2019 | .............. H01G 11/38 |
| WO | WO-2021211202 A1 | * | 10/2021 | .......... H01M 4/0404 |

OTHER PUBLICATIONS

International Search Report of the International Searching Authority for PCT/JP2018/041761 dated Jan. 29, 2019.
English translation International Search Report of the International Searching Authority for PCT/JP2018/041761 dated Jan. 29, 2019.
Chinese Office Action for Chinese Application No. 201880089337.0, dated Mar. 30, 2023, with an English translation.
Written Opinion of the International Searching Authority dated Jan. 29, 2019, in PCT/JP2018/041761.

* cited by examiner

BINDER COMPOSITION, MIXTURE FOR PRODUCING ELECTRODE FOR NON-AQUEOUS ELECTROLYTE SECONDARY BATTERY, ELECTRODE FOR NON-AQUEOUS ELECTROLYTE SECONDARY BATTERY, AND NON-AQUEOUS ELECTROLYTE SECONDARY BATTERY

TECHNICAL FIELD

The present invention relates to a binder composition, a mixture for producing an electrode for a non-aqueous electrolyte secondary battery, an electrode for a non-aqueous electrolyte secondary battery, and a non-aqueous electrolyte secondary battery.

BACKGROUND ART

Vinylidene fluoride polymers (hereinafter, when simply referred to "vinylidene fluoride polymer", the vinylidene fluoride polymer includes both homopolymers and copolymers of vinylidene fluoride) have, for example, excellent chemical resistance, weather resistance, and contamination resistance, and thus the vinylidene fluoride polymers are used in, for example, molding materials and coatings. Furthermore, since vinylidene fluoride polymer has a high electrical stability, such a vinylidene fluoride polymer is used in, for example, a binder for an electrode for adhering an electrode active material of the non-aqueous electrolyte secondary battery to a surface of a current collector. Meanwhile, the vinylidene fluoride polymer has a low adhesive strength to various substrates, and enhancement of the adhesive strength to substrates has been demanded.

Therefore, a method of enhancing the adhesive strength of a fluororesin to various substrate has been studied. For example, Patent Document 1 describes that adhesion of a fluororesin having a curable functional group, such as a hydroxyl group, to a sealing agent of a solar cell module is enhanced by using a polyisocyanate compound derived from xylylene diisocyanate or bis(isocyanate)cyclohexane as a curing agent of the fluororesin. Furthermore, Patent Document 2 describes that, by an adhesive resin, in which a main chain has miscibility with a fluororesin and which has a functional group, such as an isocyanate group, having reactivity to a substrate surface, adhesive strength of the fluororesin to a substrate film formed from a resin is enhanced.

CITATION LIST

Patent Document

Patent Document 1: JP 2013-117023 A
Patent Document 2: JP 2009-522414 T

SUMMARY OF INVENTION

Technical Problem

When a vinylidene fluoride polymer is used for, for example, a binder for an electrode of a non-aqueous electrolyte secondary battery, it has been demanded to enhance adhesive strength of an electrode mixture layer containing the vinylidene fluoride polymer and an active material to a metal surface, such as copper and aluminum, used as a current collector.

Note that, according to technologies described in Patent Document 1 and Patent Document 2, since adhesive strength of the vinylidene fluoride polymer to a metal surface is enhanced, it is expected that the adhesive strength of the electrode mixture layer to a surface of a current collector is also enhanced. However, a vinylidene fluoride polymer used in a binder for an electrode of a non-aqueous electrolyte secondary battery is desired to adhere an electrode mixture layer to a surface of a current collector with a higher adhesive strength from the perspective of, for example, enhancing cycle characteristics of the battery.

The present invention was completed in light of the problems described above, and an object of the present invention is to provide a binder composition of a non-aqueous electrolyte secondary battery, which contains a vinylidene fluoride polymer and is capable of further enhancing adhesive strength of the electrode mixture layer to a surface of a current collector; a mixture for producing an electrode for a non-aqueous electrolyte secondary battery using the binder composition; an electrode for a non-aqueous electrolyte secondary battery; and a non-aqueous electrolyte secondary battery.

Solution to Problem

The binder composition of a non-aqueous electrolyte secondary battery according to an embodiment of the present invention to solve the problem described above contains a vinylidene fluoride copolymer containing: a first constituent unit derived from vinylidene fluoride, and a second constituent unit containing an isocyanate group or having a structure that produces an isocyanate group when heated at 200° C. for 1 hour.

Furthermore, the mixture for producing an electrode for a non-aqueous electrolyte secondary battery according to an embodiment of the present invention to solve the problem described above contains the binder composition described above and an electrode active material.

Furthermore, the electrode for a non-aqueous electrolyte secondary battery according to an embodiment of the present invention to solve the problem described above has a current collector and an electrode mixture layer formed on a surface of the current collector, and the electrode mixture layer contains the binder composition described above and an electrode active material.

Furthermore, the non-aqueous electrolyte secondary battery according to an embodiment of the present invention to solve the problem described above has the electrode for a non-aqueous electrolyte secondary battery described above.

Advantageous Effects of Invention

According to the present invention, a binder composition of a non-aqueous electrolyte secondary battery, which contains a vinylidene fluoride polymer and is capable of further enhancing adhesive strength of the electrode mixture layer to a surface of a current collector, a mixture for producing an electrode for a non-aqueous electrolyte secondary battery, an electrode for a non-aqueous electrolyte secondary battery, and a non-aqueous electrolyte secondary battery using the binder composition are provided.

DESCRIPTION OF EMBODIMENTS

As a result of diligent research on the problem described above, the present inventors found that adhesion of an electrode mixture layer to a surface of a current collector can be further enhanced than those of known technologies by a binder composition containing a vinylidene fluoride copolymer (hereinafter, also referred to as "vinylidene fluoride copolymer (A)") containing a first constituent unit derived from vinylidene fluoride, and a second constituent unit containing an isocyanate group or having a structure that produces an isocyanate group when heated at 200° C. for 1 hour, and further researched and completed the present invention.

Note that, as described in Patent Document 1 and Patent Document 2, even when a resin having an isocyanate group is used together with a vinylidene fluoride polymer, it is expected to enhance adhesion of the electrode mixture layer containing the vinylidene fluoride polymer described above to a substrate. In contrast, the vinylidene fluoride copolymer (A) can achieve an electrode mixture layer having even higher adhesion that can adequately tolerate repeated use required for, for example, a binder of a non-aqueous electrolyte secondary battery. It is conceived that this is because adhesion of the copolymer itself is enhanced due to an isocyanate group or a structure that produces an isocyanate group when heated at 200° C. for 1 hour (hereinafter, also simply referred to as "NCO-producing structure") in the molecule of the vinylidene fluoride polymer.

Furthermore, two-part compositions described in Patent Document 1 and Patent Document 2 require operation, such as mixing, at the time of use and is unsuitable for, for example, mass production of electrodes for non-aqueous electrolyte secondary batteries. In contrast, since the vinylidene fluoride copolymer (A) has an isocyanate group or an NCO-producing structure in the molecule of the vinylidene fluoride polymer, mixing at the time of use is not necessary, and thus, for example, production of an electrode for a non-aqueous electrolyte secondary battery by coating to a surface of a current collector is further facilitated.

Note that, according to knowledge of the present inventors, a slurry mixture for forming a positive electrode or a negative electrode using the vinylidene fluoride copolymer (A) is less likely to be gelled even when stored for a long period of time. Therefore, for example, a binder composition containing the vinylidene fluoride copolymer (A) can be stored or transported for a long period of time after the binder composition is formed into a mixture to produce an electrode or can suppress coating failure to a surface of a current collector caused by gelling.

1. Binder Composition

The binder composition of a non-aqueous electrolyte secondary battery according to an embodiment of the present invention contains at least the vinylidene fluoride copolymer (A). Note that, in the present specification, "binder composition of a non-aqueous electrolyte secondary battery" or "binder composition" refers to a resin composition used to maintain an electrode active material on a current collector of a non-aqueous electrolyte secondary battery.

The vinylidene fluoride copolymer (A) is a copolymer containing a first constituent unit derived from vinylidene fluoride, and a second constituent unit containing an isocyanate group or having a structure that produces an isocyanate group when heated at 200° C. for 1 hour (NCO-producing structure). The vinylidene fluoride copolymer (A) may have another constituent unit besides the first constituent unit and the second constituent unit.

1-1. First Constituent Unit

The first constituent unit is a constituent unit derived from vinylidene fluoride.

When the total amount of the first constituent unit and the second constituent unit in the vinylidene fluoride copolymer (A) is 100 mol %, the content of the first constituent unit in the vinylidene fluoride copolymer (A) is preferably from 90 mol % to 99.99 mol %, more preferably from 93 mol % to 99.98 mol %, and even more preferably from 96 mol % to 99.97 mol %. The content of the first constituent unit in the vinylidene fluoride copolymer (A) can be adjusted to the range described above by adjusting the proportion of vinylidene fluoride in the monomer to be charged as a raw material. Furthermore, the proportion of the content of the first constituent unit in the vinylidene fluoride copolymer (A) can be determined by known measurement methods, such as $^1$H-NMR and infrared spectroscopy.

1-2. Second Constituent Unit

The second constituent unit is a constituent unit having an isocyanate group or a constituent unit having an NCO-producing structure. Typically, the second constituent unit has an isocyanate group or an NCO-producing structure in a side chain.

The second constituent unit can be a constituent unit having a structure derived from a monomer containing an ethylenically unsaturated group and an isocyanate group in the molecule (hereinafter, also simply referred to as "NCO monomer") or a monomer containing an ethylenically unsaturated group and an NCO-producing structure in the molecule (hereinafter, the monomer is also simply referred to as "NCO-producing monomer").

For example, the second constituent unit can be introduced into the vinylidene fluoride copolymer (A) by subjecting the NCO monomer or the NCO-producing monomer to graft polymerization with the vinylidene fluoride polymer activated by irradiation of, for example, an electron beam.

Alternatively, the second constituent unit can be introduced into the vinylidene fluoride copolymer (A) by subjecting the vinylidene fluoride and the NCO-producing monomer to copolymerization.

The NCO monomer or the NCO-producing monomer may be, for example, a compound having a structure in which an atomic group containing a carbon atom, an oxygen atom, and a nitrogen atom, and an ethylenically unsaturated group are directly or indirectly linked, and the atomic group has an isocyanate group or an NCO-producing structure. From the perspective of being less likely to impair characteristics for the vinylidene fluoride polymer, such as high electrical stability, the atomic group is preferably one having the total number of carbon atoms and oxygen atoms from 1 to 18 and having a molecular weight of 500 or less.

The ethylenically unsaturated group contained in the NCO monomer or NCO-producing monomer is not particularly limited and, for example, can be a vinyl group or a functional group represented by RR'C=CR"—CO— (R, R', and R" each independently represent a hydrogen atom, a chlorine atom, or a linear or branched alkyl group having from 1 to 5 carbons that may be at least partially substituted with a chlorine atom), such as a (meth)acryloyl group. From the perspective of high reactivity, a (meth)acryloyl group is preferred. Note that, in the present specification, (meth)acryloyl means "acryloyl or methacryloyl", (meth)acrylate means "acrylate or methacrylate", and (meth)acrylic acid means "acrylic acid or methacrylic acid".

The NCO monomer has only to contain one or more isocyanate groups in the molecule but may contain only one isocyanate group in the molecule or may contain two or more isocyanate groups in the molecule.

The NCO monomer can be, for example, a monomer having a structure represented by General Formula (1) below.

[Chemical Formula 1]

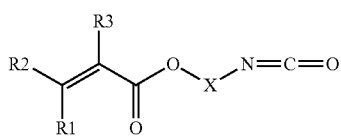

General Formula (1)

In General Formula (1), R1, R2, and R3 each independently represent a hydrogen atom, a fluorine atom, a chlorine atom, or a linear or branched alkyl group having from 1 to 5 carbons that may be at least partially substituted with a fluorine atom or a chlorine atom. X represents an atomic group having a total number of carbon atoms and oxygen atoms from 1 to 18 and a molecular weight of 458 or less, and preferably represents a linear, branched, or cyclic alkylene group or oxyalkylene group.

Examples of the NCO monomer include 2-isocyanatoethyl (meth)acrylate (IEA/IEMA), 3-isocyanatopropyl (meth)acrylate, 2-isocyanato-1-methylethyl (meth)acrylate, 2-isocyanato-1,1-dimethylethyl (meth)acrylate, and 4-isocyanatocyclohexyl (meth)acrylate. Among these, 2-isocyanatoethyl (meth)acrylate is preferred from the perspective of, for example, availability.

The NCO-producing monomer can be, for example, a monomer having a structure represented by General Formula (2) below.

[Chemical Formula 2]

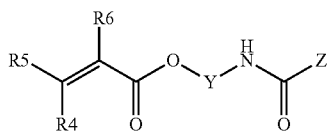

General Formula (2)

In General Formula (2), R4, R5, and R6 each independently represent a hydrogen atom, a fluorine atom, a chlorine atom, or a linear or branched alkyl group having from 1 to 5 carbons that may be at least partially substituted with a fluorine atom or a chlorine atom. Y represents an atomic group having a total number of carbon atoms and oxygen atoms from 1 to 18 and a molecular weight of 458 or less, and preferably represents a linear, branched, or cyclic alkylene group or oxyalkylene group. Z is an atomic group containing an atom selected from the group consisting of an oxygen atom, a sulfur atom, and a nitrogen atom, and having a molecular weight of 200 or less, and represents a structure that produces an isocyanato group by dissociation of Z.

Examples of the NCO-producing structure contained in the NCO-producing monomer include known block isocyanate structures obtained by masking an isocyanate group by a blocking agent (atomic group Z in General Formula (2)). However, the NCO-producing structure is not limited to known block isocyanate structures as long as an isocyanate group is formed by the heating. When the composition containing the vinylidene fluoride copolymer (A) is coated on a surface of a current collector and heated, since an isocyanate group having a high adhesion is formed, the NCO-producing structure can enhance adhesion of the vinylidene fluoride copolymer (A) to the surface of the current collector.

Examples of the blocking agent when the NCO-producing structure is a block isocyanate structure include known blocking agents, such as oxime-based compounds, pyrazole-based compounds, mercaptan-based compounds, alcohol-based compounds, alkylphenol-based compounds, phenol-based compounds, active methylene-based compounds, acid amide-based compounds, acid imide-based compounds, imidazole-based compounds, urea-based compounds, amine-based compounds, and imide-based compounds.

Examples of the oxime-based compound as the blocking agent include butanone oxime (methyl ethyl ketone oxime), formaldoxime, acetaldoxime, acetoxime, and cyclohexanone oxime.

Examples of the pyrazole-based compound as the blocking agent include pyrazole, 3-methylpyrazole, and 3,5-dimethylpyrazole.

Examples of the mercaptan-based compound as the blocking agent include butyl mercaptan and dodecyl mercaptan.

Examples of the alcohol-based compound as the blocking agent include methanol, ethanol, 2-propanol, n-butanol, sec-butanol, 2-ethyl-1-hexanol, 2-methoxyethanol, 2-ethoxyethanol, and 2-butoxyethanol.

Examples of the alkylphenol-based compound as the blocking agent include monoalkylphenol compounds or dialkylphenol compounds, which have an alkyl group having 4 or more carbon atoms as a substituent.

Examples of the monoalkylphenol compound as the blocking agent include n-propylphenol, i-propylphenol, n-butylphenol, sec-butylphenol, t-butylphenol, n-hexylphenol, 2-ethylhexylphenol, n-octylphenol, and n-nonylphenol.

Examples of the dialkylphenol compound as the blocking agent include di-n-propylphenol, diisopropylphenol, isopropyl cresol, di-n-butylphenol, di-t-butylphenol, di-sec-butylphenol, di-n-octylphenol, di-2-ethylhexylphenol, and di-n-nonylphenol.

Examples of the phenol-based compound as the blocking agent include phenol, cresol, ethylphenol, styrenated phenol, and hydroxybenzoate.

Examples of the active methylene-based compound as the blocking agent include ethyl isobutanoylacetate, dimethyl malonate, diethyl malonate, methyl acetoacetate, ethyl acetoacetate, and acetylacetone.

Examples of the acid amide-based compound as the blocking agent include acetanilide, amide acetate, ε-caprolactam, δ-valerolactam, and γ-butyrolactam.

Examples of the acid imide-based compound as the blocking agent include succinimide and maleimide.

Examples of the imidazole-based compound as the blocking agent include imidazole and 2-methylimidazole.

Examples of the urea-based compound as the blocking agent include urea, thiourea, and ethylene urea.

Examples of the amine-based compound as the blocking agent include diphenylamine, aniline, carbazole, di-n-propylamine, diisopropylamine, isopropylethylamine, diisobutylamine, di(2-butylamine), di(t-butyl)amine, dicyclohexylamine, N-t-butylcyclohexylamine, 2-methylpiperidine, 2,6-dimethylpiperidine, and 2,2,6,6-tetramethylpiperidine.

Examples of the imine-based compound as the blocking agent include ethyleneimine and polyethyleneimine.

These blocking agents can be appropriately selected depending on, for example, the temperature at which the blocking agent dissociates to produce an isocyanate group and ease in introduction of the NCO-producing structure into the vinylidene fluoride copolymer (A). Note that the blocking agent is preferably dissociated by, for example, heating temperature at the time of drying a mixture for electrode containing the vinylidene fluoride copolymer (A) after coating the mixture to an electrode surface. From the perspective of lower the block dissociation temperature, for example, the blocking agent is preferably butanone oxime, pyrazole, and malonic acid diester, and butanone oxime and pyrazole are preferred. Furthermore, among these, from the perspective of further preventing gelling of the mixture produced by the binder composition containing the vinylidene fluoride copolymer (A), the blocking agent is preferably pyrazole.

Furthermore, the blocking agent or the atomic group represented by Z in General Formula (2) preferably has a low volatilization temperature (boiling point) from the perspective of suppressing reduction of peel strength due to masking of the isocyanate caused by a re-reaction of the isocyanate group after being dissociated by heating. From the perspective described above, the blocking agent or the atomic group represented by Z in General Formula (2) has a boiling point of preferably 100° C. to 220° C., more preferably from 100° C. to 200° C., and even more preferably from 120° C. to 180° C.

When the total amount of the first constituent unit and the second constituent unit in the vinylidene fluoride copolymer (A) is 100 mol %, the content of the second constituent unit in the vinylidene fluoride copolymer (A) is preferably from 0.01 mol % to 10 mol %, more preferably from 0.02 mol % to 7 mol %, and even more preferably from 0.03 mol % to 4 mol %. By setting a higher content for the second constituent unit, the adhesive strength of the electrode mixture layer to a surface of a current collector can be further enhanced. On the other hand, when the content of the second constituent unit is excessive, the adhesive strength may be reduced due to reduction of solubility in a non-aqueous electrolytic solution because the vinylidene fluoride copolymer (A) crosslinks. Therefore, by adjusting the content of the second constituent unit to the range described above, the adhesive strength of the electrode mixture layer to a surface of a current collector can be enhanced to the desired degree. The content of the second constituent unit in the vinylidene fluoride copolymer (A) can be adjusted to the range described above by adjusting the proportion of the NCO monomer or the NCO-producing monomer subjected to copolymerization or graft polymerization relative to the amount of the vinylidene fluoride. Furthermore, the proportion of the content of the second constituent unit in the vinylidene fluoride copolymer (A) can be determined by known measurement methods, such as $^1$H-NMR and infrared spectroscopy.

1-3. Other Constituent Unit

The vinylidene fluoride copolymer (A) may have another constituent unit besides the first constituent unit and the second constituent unit described above.

For example, from the perspective of controlling crystallinity, the vinylidene fluoride copolymer (A) may have a constituent unit that is copolymerizable with vinylidene fluoride and derived from a fluorine-containing alkylvinyl compound other than the vinylidene fluoride (hereinafter, also simply referred to as "fluorinated monomer"). Examples of the fluorinated monomer include vinyl fluoride, trifluoroethylene, tetrafluoroethylene, chlorotrifluoroethylene, and hexafluoropropylene. Among these, from the perspective of further facilitating control of crystallinity, tetrafluoroethylene, chlorotrifluoroethylene, and hexafluoropropylene are preferred, and hexafluoropropylene is more preferred.

The content of the constituent unit derived from the fluorinated monomer in the vinylidene fluoride copolymer (A) is preferably 2 mass % or greater but less than 10 mass %, more preferably from 3 mass % to 9 mass %, and even more preferably from 4 mass % to 8 mass %, relative to the total mass of the vinylidene fluoride copolymer (A).

Furthermore, from the perspectives of further enhancing adhesive strength to a surface of a current collector and suppressing swelling or the like at the time of contact with a liquid (e.g., electrolytic solution for a non-aqueous electrolyte secondary battery), the vinylidene fluoride copolymer (A) may contain a constituent unit derived from a crosslinkable alkylvinyl compound, which is copolymerizable with vinylidene fluoride and in which hydrogen atoms are at least partially substituted with fluorine atoms (hereinafter, also simply referred to as "crosslinkable monomer"). Examples of the crosslinkable monomer include perfluoro divinyl ether and perfluoroalkylene divinyl ether. Note that the perfluoroalkylene divinyl ether can be a compound having a structure in which two vinyl ether groups, in which all hydrogen atoms are substituted with fluorine atoms, are bonded by a linear or branched divalent perfluoroalkylene group having from 1 to 6 carbons.

The content of the constituent unit derived from the crosslinkable monomer in the vinylidene fluoride copolymer (A) is preferably greater than 0 mass % but less than 5 mass %, more preferably from 0.1 mass % to 4 mass %, and even more preferably from 0.3 mass % to 3 mass %, relative to the total mass of the vinylidene fluoride copolymer (A).

Furthermore, from the perspective of further enhancing adhesive strength to a surface of a current collector by imparting polarity to the copolymer, the vinylidene fluoride copolymer (A) may have a constituent unit derived from an unsaturated dibasic acid or an unsaturated dibasic acid monoester. The unsaturated dibasic acid is an unsaturated dicarboxylic acid or a derivative thereof and, especially, can be a compound, in which two carboxyl groups are bonded by a linear or branched unsaturated alkylene group having from 1 to 6 carbons. Examples of the unsaturated dibasic acid include maleic acid, fumaric acid, itaconic acid, and citraconic acid. The unsaturated dibasic acid monoester is a monoester compound derived from the unsaturated dibasic acid described above. Examples of the unsaturated dibasic acid monoester include monomethyl maleate, monoethyl maleate, monomethyl citraconate, and monoethyl citraconate.

Furthermore, from the perspective of further enhancing adhesive strength to a surface of a current collector by imparting polarity to the copolymer, the vinylidene fluoride copolymer (A) may have a constituent unit that is copolymerizable with vinylidene fluoride and derived from a compound containing a polar group (hereinafter, also simply referred to as "polar group-containing compound"). Examples of the polar group-containing compound include (meth)acrylic acid, 2-carboxyethyl(meth)acrylate, (meth)acryloyloxyethyl succinic acid, (meth)acryloyloxypropyl succinic acid, and glycidyl(meth)acrylate.

The content of the constituent unit derived from the unsaturated dibasic acid, unsaturated dibasic acid monoester, or fluorine-containing polymerizable monomer described above in the vinylidene fluoride copolymer (A) can be freely set in the range that does not significantly reduce the adhesion of the vinylidene fluoride copolymer (A) to a surface of a current collector.

1-4. Physical Properties and the Like

To ensure high chemical resistance, weather resistance, contamination resistance, and electrical stability of vinylidene fluoride, especially to ensure high electrical stability, the content of the constituent unit derived from the vinylidene fluoride in the vinylidene fluoride copolymer (A) is preferably 50 mass % or greater, more preferably 80 mass % or greater, even more preferably 85 mass % or greater, and particularly preferably 87 mass % or greater, relative to the total mass of the vinylidene fluoride copolymer (A).

Furthermore, from the perspective of enhancing impact resistance of a produced electrode and enhancing processability to form an electrode, the inherent viscosity ($\eta i$) of the vinylidene fluoride copolymer (A) is preferably from 0.50 dL/g to 5.0 dL/g, more preferably from 1.0 dL/g to 4.0 dL/g, even more preferably from 1.0 dL/g to 3.5 dL/g, and particularly preferably from 1.5 dL/g to 3.5 dL/g.

The inherent viscosity ($\eta i$) can be determined by the following equation based on the viscosity ($\eta$) at 30° C. of a solution of the vinylidene fluoride copolymer (A) in N-methylpyrrolidone (NMP), the viscosity ($\eta 0$) of the NMP at 30° C., and the concentration (C) of the vinylidene fluoride copolymer (A) in the solution.

$$\eta i = (1/C) \ln (\eta/\eta 0)$$

Furthermore, from the perspective of achieving all high chemical resistance, weather resistance, contamination resistance, and electrical stability of vinylidene fluoride, especially high electrical stability, and high adhesion due to the isocyanate group or the NCO-producing structure, the vinylidene fluoride copolymer (A) has an absorbance ratio ($A_{NCO}$) originated from stretching motion of the isocyanate group, as calculated from infrared spectrum (IR spectrum) obtained by measuring the vinylidene fluoride copolymer (A) after being heated for 1 hour at 200° C., of preferably from 0.10 to 30, more preferably from 0.10 to 15, even more preferably from 0.10 to 10, yet even more preferably from 0.10 to 5.0, yet even more preferably from 0.10 to 3.0, yet even more preferably from 0.10 to 2.0, yet even more preferably from 0.10 to 1.0, and yet even more preferably from 0.10 to 0.50.

The $A_{NCO}$ can be calculated by the following equation based on the absorbance originated from the stretching vibration of the isocyanate group detected around 2280 cm$^{-1}$ ($A_{2280}$) and the absorbance originated from the stretching vibration of C—H detected around 3023 cm$^{-1}$ ($A_{3023}$) in the infrared spectrum (IR spectrum) determined in the range from 1500 cm$^{-1}$ to 4000 cm$^{-1}$.

$$A_{NCO} = A_{2280}/A_{3023}$$

1-5. Synthesis Method of Vinylidene Fluoride Copolymer (A)

The vinylidene fluoride copolymer (A) can be synthesized by polymerizing vinylidene fluoride by a known polymerization method, including an emulsion polymerization method and a suspension polymerization method, and then graft-polymerizing an NCO monomer or an NCO-producing monomer with the obtained polymer.

Alternatively, the vinylidene fluoride copolymer (A) can be synthesized by copolymerizing vinylidene fluoride and an NCO-producing monomer by a known polymerization method, including an emulsion polymerization method and a suspension polymerization method.

When the vinylidene fluoride copolymer (A) contains a constituent unit derived from a monomer other than the vinylidene fluoride, the NCO monomer, or the NCO-producing monomer, such as the fluorinated monomer, crosslinkable monomer, unsaturated dibasic acid, unsaturated dibasic acid monoester, and fluorine-containing polymerizable monomer described above, these monomers may be copolymerized at the time of the polymerization described above.

1-5-1. Emulsion Polymerization Method

In the emulsion polymerization method, into a liquid mixture obtained by mixing a liquid medium in which the monomers described above are insoluble, the monomers described above, and an emulsifier, a polymerization initiator that is soluble in the liquid medium is further added to polymerize the monomers.

For the liquid medium, the monomers described above have only to be insoluble. Since the monomers described above are insoluble in water, the liquid medium is preferably water.

The emulsifier has only to be an emulsifier that allows formation of micelles of the monomer in the liquid medium and that can stably disperse, in the liquid medium, the polymer synthesized by the emulsion polymerization method, and a known surfactant can be appropriately selected and used. The emulsifier only has to be a surfactant that is used for synthesis of vinylidene fluoride copolymers in the related art, and examples thereof include perfluorinated surfactants, partially fluorinated surfactants, and non-fluorinated surfactants. Among these surfactants, a perfluoroalkylsulfonic acid and a salt thereof, a perfluoroalkylcarboxylic acid and a salt thereof, and a fluorine-based surfactant having a fluorocarbon chain or fluoropolyether chain are preferred. A perfluoroalkylcarboxylic acid and a salt thereof is more preferred.

The polymerization initiator is a polymerization initiator that is soluble in the liquid medium, and examples thereof include water-soluble peroxides, water-soluble azo-based compounds, and redox initiator systems. Examples of the water-soluble peroxide include ammonium persulfate and potassium persulfate. Examples of the water-soluble azo-based compound include 2,2'-azobis-isobutyronitrile (AIBN) and 2,2'-azobis-2-methylbutyronitrile (AMBN). Examples of the redox initiator system include ascorbic acid-hydrogen peroxide. Among these, the polymerization initiator is preferably a water-soluble peroxide.

Note that the emulsion polymerization method may be a soap-free emulsion polymerization method or a mini-emulsion polymerization method.

In the soap-free emulsion polymerization method, as the emulsifier, use of a reactive emulsifier that is a substance having a polymerizable double bond in the molecule and acting as an emulsifier is preferred. The reactive emulsifier allows formation of the micelles in the system during the early stage of the polymerization; however, as the polymerization progresses, the reactive emulsifier is used as a monomer and consumed in the polymerization reaction, and thus the reactive emulsifier hardly exists in a free state in the reaction system finally obtained. Therefore, the reactive emulsifier is less likely to be bled out of a surface of a particle of the obtained polymer.

Examples of reactive emulsifier include polyoxyalkylene alkenyl ethers, sodium alkylallylsulfosuccinate, sodium methacryloyloxy polyoxypropylene sulfonate, and alkoxy polyethylene glycol methacrylate.

Note that, in the case where the monomers are dispersed in the liquid medium without the reactive emulsifier, the soap-free polymerization may also be performed without using a reactive emulsifier.

In the mini-emulsion polymerization method, the micelle is made finer to a sub-micron size by applying a strong shearing force using an ultrasonic wave oscillator or the like, and the polymerization is then performed. At this time, to stabilize the fine micelle, a known hydrophobe is added to the liquid mixture. In the mini-emulsion polymerization method, typically, the polymerization reaction only occurs inside of each of the micelles, and each of the micelles becomes a fine particle of the polymer, and thus, for example, the particle size and the particle size distribution of the obtained fine particle of the polymer is easily controlled.

1-5-2. Suspension Polymerization Method

In the suspension polymerization method, a monomer dispersion obtained by dissolving an oil-soluble polymerization initiator in each of the monomers described above is mechanically agitated and heated in water containing a suspending agent, a chain transfer agent, a stabilizer, and a dispersant to suspend and disperse the monomer, and a polymerization reaction is thus caused in a droplet of the suspended monomer. In the suspension polymerization method, typically, the polymerization reaction only occurs inside of each of the droplets of the monomer, and each of the droplets of the monomer becomes a fine particle of the polymer, and thus, for example, the particle size and the particle size distribution of the obtained fine particle of the polymer is easily controlled.

Examples of the polymerization initiator include diisopropyl peroxydicarbonate, dinormal propyl peroxydicarbonate, dinormal heptafluoropropyl peroxy dicarbonate, diisopropyl peroxydicarbonate, isobutyryl peroxide, di(chlorofluoroacyl)peroxide, di(perfluoroacyl)peroxide, and t-butyl peroxypivalate.

Examples of the suspending agent include methyl cellulose, hydroxyethyl cellulose, hydroxypropyl cellulose, hydroxypropyl methyl cellulose, partially saponified polyvinyl acetate, and acrylic acid-based polymers.

Examples of the chain transfer agent include ethyl acetate, methyl acetate, diethyl carbonate, acetone, ethanol, n-propanol, acetaldehyde, propylaldehyde, ethyl propionate, and carbon tetrachloride.

1-5-3. Graft Modification

For the graft polymerization, the vinylidene fluoride polymer obtained by the polymerization method described above is irradiated with radiation in an atmosphere of an inert gas, such as nitrogen. Then, the vinylidene fluoride polymer activated by the irradiation with radiation, and an NCO monomer or NCO-producing monomer are mixed, and the vinylidene fluoride polymer and the NCO monomer or the NCO-producing monomer are reacted.

The radiation can be an $\alpha$ ray, $\beta$ ray, $\gamma$ ray, X ray, neutron beam, proton beam, or electron beam; however, from the perspectives of safety and reactivity, a $\gamma$ ray and electron beam are preferred, and an electron beam is more preferred. For the radiation, irradiation is performed in a manner that the absorbed dose of the mixture is preferably from 0.1 kGy to 200 kGy, and more preferably from 1 kGy to 50 kGy.

At the time of mixing the vinylidene fluoride polymer activated by the irradiation with radiation, and an NCO monomer or NCO-producing monomer, a solvent for dissolving the NCO monomer or the NCO-producing monomer may be further mixed.

2. Use of Binder Composition

The binder composition can be used to produce a binder of a non-aqueous electrolyte secondary battery. When the binder composition is a raw material to produce an electrode for a non-aqueous electrolyte secondary battery, the binder composition is used as a one-part composition.

2-1. Mixture for Producing Electrode for Non-Aqueous Electrolyte Secondary Battery The binder composition may be mixed with an electrode active material to form a mixture for producing an electrode of a non-aqueous electrolyte secondary battery. The mixture may optionally contain conductive auxiliary agents, non-aqueous solvents, pigment dispersants, adhesive auxiliary agents, and other resins.

The electrode active material may be an active material for a negative electrode or an active material for a positive electrode.

Examples of the active material for a negative electrode include carbon materials, metal materials, alloy materials, and metal oxides, which are used as active materials for negative electrodes in the art. Among these, from the perspective of further enhancing the energy density of the battery, carbon materials are preferred, and artificial graphite, natural graphite, non-graphitizable carbon, and graphitizable carbon, and the like are more preferred. Examples of the artificial graphite include artificial graphite obtained by carbonizing an organic material, performing heat treatment at a high temperature, and pulverizing and fractionating the resulting mixture. Examples of the non-graphitizable carbon include non-graphitizable carbon obtained by firing a material derived from a petroleum pitch at 1000 to 1500° C. Note that the positive electrode active material may be a commercially available product.

From the perspective of suppressing decomposition of electrolytic solution and suppressing increase of initial irreversible capacity, the specific surface area of the active material for a negative electrode is preferably from 0.3 m$^2$/g to 10 m$^2$/g, and more preferably from 0.6 m$^2$/g to 6 m$^2$/g.

Examples of the active material for a positive electrode include lithium-based positive electrode active materials. Examples of the lithium-based positive electrode active material include composite metal chalcogenide compounds represented by the general formula LiMY$_2$ (where M is at least one or more of transition metals such as Co, Ni, Fe, Mn, Cr, or V, and Y is a chalcogen element such as O or S) such as LiCoO$_2$ or LiNi$_x$Co$_{1-x}$O$_2$ (0<x≤1); composite metal oxides having a spinel structure such as LiMn$_2$O$_4$, and olivine-type lithium compounds such as LiFePO$_4$. Note that the positive electrode active material may be a commercially available product.

From the perspective of suppressing decomposition of electrolytic solution and suppressing increase of initial irreversible capacity, the specific surface area of the active material for a positive electrode is preferably from 0.05 m$^2$/g to 50 m$^2$/g, and more preferably from 0.1 m$^2$/g to 30 m$^2$/g.

The specific surface area of the electrode active material can be determined by a nitrogen adsorption method.

The conductive auxiliary agent can further enhance electrical conductivity between electrode active materials or between an electrode active material and a current collector.

Examples of the conductive auxiliary agent include acetylene black, Ketjen black, carbon nanofibers, carbon nanotubes, and carbon fibers.

The amount of the electrical conductivity added can be freely set depending on the type of the used conductive auxiliary agent; however, from the perspective of enhancing both electrical conductivity and dispersibility of the conductive auxiliary agent, the mixture can contain from 0.1 mass % to 15 mass %, preferably from 0.1 mass % to 7 mass %, and more preferably from 0.1 mass % to 5 mass %, of the conductive auxiliary agent relative to the total amount of the electrode active material, the vinylidene fluoride copolymer (A), and the conductive auxiliary agent.

Examples of the non-aqueous solvent include acetone, dimethyl sulfoxide, ethyl methyl ketone, diisopropyl ketone, cyclohexanone, methyl cyclohexane, ethyl acetate, γ-butyrolactone, tetrahydrofuran, acetamide, N-methyl pyrrolidone, N,N-dimethylformamide, propylene carbonate, dimethyl carbonate, ethyl methyl carbonate, and diethyl carbonate.

Examples of the pigment dispersant include polyvinylpyrrolidone.

Examples of the adhesive auxiliary agent include polyacrylic acid and polymethacrylic acid.

Examples of the above-mentioned other resin include polytetrafluoroethylene (PTFE), styrene/butadiene rubber (SBR), and polyacrylonitrile (PAN). The content of the other resin is preferably 25 mass % or less relative to the amount of the binder composition added.

The mixture is formed by preferably adding from 0.2 parts by mass to 15 parts by mass, and more preferably from 0.5 parts by mass to 10 parts by mass, of the binder composition when the total amount of the binder composition and the electrode active material is 100 parts by mass. Meanwhile, the mixture contains preferably from 85 parts by mass to 99.8 parts by mass, and more preferably from 90 parts by mass to 99.5 parts by mass, of the electrode active material when the total amount of the binder composition and the electrode active material is 100 parts by mass.

In the case where a conductive auxiliary agent is contained, the mixture contains preferably from 0.5 parts by mass to 15 parts by mass, and more preferably from 0.5 parts by mass to 5 parts by mass, of the conductive auxiliary agent when the total amount of the binder composition and the electrode active material is 100 parts by mass.

The mixture contains preferably from 20 parts by mass to 300 parts by mass, and more preferably from 50 parts by mass to 200 parts by mass, of the non-aqueous solvent when the total amount of the binder composition and the electrode active material is 100 parts by mass.

The mixture contains preferably from 0.1 parts by mass to 10 parts by mass, and more preferably from 0.1 parts by mass to 5 parts by mass, of a thickener when the total amount of the binder composition, the electrode active material, and the conductive auxiliary agent is 100 parts by mass.

The mixture containing the components in the blending ratio described above can produce an electrode mixture layer having a high adhesive strength to a current collector.

The mixture can be produced by adding and mixing the components, such as the electrode active material and the thickener, into the binder composition described above.

2-2. Electrode for Non-Aqueous Electrolyte Secondary Battery

The mixture can be used to produce an electrode for a non-aqueous electrolyte secondary battery by coating the mixture to a surface of a current collector for a negative electrode or a positive electrode, and drying to form an electrode mixture layer. The electrode mixture layer may be formed only on one face of the current collector but is preferably formed on both faces.

Examples of the current collector for a negative electrode include copper. The copper may be metallic copper or may be a material obtained by applying copper foil on a surface of another medium.

Examples of the current collector for a positive electrode include aluminum. The aluminum may be a material obtained by applying aluminum foil on a surface of another medium or may be a material obtained by adding a net-like aluminum.

The thickness of the current collector for a negative electrode or a positive electrode is preferably from 5 μm to 100 μm, and more preferably from 5 μm to 20 μm.

The electrode mixture layer can be formed by coating the mixture described above on the current collector and drying. The coating method is not particularly limited and, for example, can be a method of coating by a bar coater, die coater, or comma coater. The drying after the coating is typically performed at 50° C. to 150° C. for 1 minute to 300 minutes. The drying may be performed for multiple times at various temperatures. During the drying, pressure may be applied; however, typically, the drying is performed under atmospheric pressure or reduced pressure. After the drying, heat treatment may be performed. The heat treatment is typically performed at 100° C. to 300° C. for 10 seconds to 300 minutes.

In the case where the vinylidene fluoride copolymer (A) contains the NCO-producing structure described above, the drying is performed at a temperature and for a duration that allow the NCO-producing structure to produce an isocyanate group. For example, the drying has only to be performed at 100° C. or higher for 1 hour or longer.

After the coating and drying, press treatment may be further performed. The press treatment is typically performed at 1 MPa to 200 MPa. By performing the press treatment, electrode density can be enhanced.

For the positive electrode, the thickness of the electrode mixture layer is preferably from 40 μm to 500 μm, and more preferably from 100 μm to 400 μm. For the negative electrode, the thickness of the electrode mixture layer is preferably from 20 μm to 400 μm, and more preferably from 40 μm to 300 μm.

For the electrode mixture layer, the basis weight is preferably from 20 $g/m^2$ to 700 $g/m^2$, and more preferably from 30 $g/m^2$ to 500 $g/m^2$.

2-3. Non-Aqueous Electrolyte Secondary Battery

The electrode described above can be combined with, for example, a known non-aqueous electrolyte and a known separator to form a non-aqueous electrolyte secondary battery.

EXAMPLES

Specific examples of the present invention will be described hereinafter with comparative examples, but the present invention is not limited to these.

1. Synthesis of (Co)Polymer
1-1. Synthesis of Vinylidene Fluoride Copolymer
1-1-1. Vinylidene Fluoride Copolymer A-1

In a bag formed from polyethylene (Lami-Zip, available from Seisannipponsha Ltd.; "Lami-Zip" is a trade name of Seisannipponsha Ltd.), an oxygen scavenger and 60 g of polyvinylidene fluoride (KF #7200, available from Kureha Corporation) were charged, and inside of the bag was purged with nitrogen. Thereafter, an opening of the bag was heat-sealed and airtightly closed. In this bag in which polyvinylidene fluoride is tightly sealed, an electron beam was irradiated in a manner that the absorbed dose for the polyvinylidene fluoride was 30 kGy, and thus an electron beam-irradiated polyvinylidene fluoride was produced.

Thereafter, in a screw cap bottle having a internal capacity of 100 mL, 0.52 g of 2-isocyanatoethyl methacrylate (IEMA, available from Sigma-Aldrich), 51.38 g of toluene, and 30 g of the electron beam-irradiated polyvinylidene fluoride were charged and mixed in a nitrogen atmosphere, and then allowed to stand still at room temperature for 3 hours. After the polymer slurry obtained as described above was washed with acetone, the polymer slurry was dried, and thus a vinylidene fluoride copolymer A-1, which was a graft polymer of polyvinylidene fluoride containing an isocyanate group, was obtained.

1-1-2. Vinylidene Fluoride Copolymer A-2

A vinylidene fluoride copolymer A-2, which was a graft polymer of polyvinylidene fluoride containing an isocyanate group, was obtained by performing the same operation as in the synthesis of the vinylidene fluoride copolymer A-1 except for changing the amount of 2-isocyanatoethyl methacrylate charged to 1.56 g and the amount of toluene charged to 50.34 g.

1-1-3. Vinylidene Fluoride Copolymer A-3

A vinylidene fluoride copolymer A-3, which was a graft polymer of polyvinylidene fluoride containing an isocyanate group, was obtained by performing the same operation as in the synthesis of the vinylidene fluoride copolymer A-1 except for changing the amount of 2-isocyanatoethyl methacrylate charged to 2.60 g and the amount of toluene charged to 49.30 g.

1-1-4. Vinylidene Fluoride Copolymer A-4

In an autoclave having a internal capacity of 2 L, 1240 g of ion exchanged water, 0.4 g of METOLOSE SM-100 (available from Shin-Etsu Chemical Co., Ltd.), 2.0 g of 50 wt % diisopropyl peroxydicarbonate-HFE-347pc-f solution, 400 g of vinylidene fluoride, and 4 g of 2-(0-[1'-methylpropylideneamino]carboxyamino)ethyl methacrylate (Karenz MOI-BM, available from Showa Denko K.K.; "Karenz" is a trade name of Showa Denko K.K.) were charged, and the temperature was increased to 45° C. over 2 hours and maintained at 45° C. After the completion of the polymerization, the obtained polymer slurry was dehydrated and dried, and thus a vinylidene fluoride copolymer A-4, which was a vinylidene fluoride copolymer containing a block isocyanate group, was obtained.

1-1-5. Vinylidene Fluoride Copolymer A-5

A vinylidene fluoride copolymer A-5, which was a vinylidene fluoride copolymer containing a block isocyanate group, was obtained by performing the same method as in the synthesis of the vinylidene fluoride copolymer A-4 except for changing the 2-(0-[1'-methylpropylideneamino] carboxyamino)ethyl methacrylate to 2-[(3,5-dimethylpyrazolyl)carbonylamino]ethyl methacrylate (Karenz MOI-BP, available from Showa Denko K.K.).

1-2. Synthesis of Other (Co)Polymer 1-2-1. Vinylidene Fluoride Copolymer B-1

In a screw cap bottle having an internal capacity of 100 mL, 0.52 g of 2-hydroxyethyl acrylate (HEA, available from Tokyo Chemical Industry Co., Ltd.), 38.38 g of ion exchanged water, 14.3 g of 2-propanol, and 30 g of the electron beam-irradiated polyvinylidene fluoride obtained in the synthesis process of the vinylidene fluoride copolymer 1 were charged and mixed in a nitrogen atmosphere, and then allowed to stand still at room temperature for 3 hours. After the polymer slurry obtained as described above was washed with acetone, the polymer slurry was dried, and thus a vinylidene fluoride copolymer B-1, which was a graft polymer of polyvinylidene fluoride containing a hydroxy group, was obtained.

2. Measurement of Physical Properties of (Co)Polymer 2-1. Constituent Unit Amount of Comonomer Relative to Amount of Vinylidene Fluoride $^1$H-NMR spectrum of each of the vinylidene fluoride copolymer A-1 to the vinylidene fluoride copolymer A-5 and the vinylidene fluoride copolymer B-1 was obtained under the following conditions.

Instrument: AVANCE AC 400FT NMR spectrometer, available from Bruker Corp.

Measurement Conditions

Frequency: 400 MHz

Measurement solvent: DMSO-$d_6$

Measurement temperature: 25° C.

From the $^1$H-NMR spectra, the constituent unit amount of the comonomer relative to the amount of the vinylidene fluoride was calculated based on the ratio of the integrated intensity of the signal originated from each comonomer to the integrated intensity of the signal at 2.24 ppm and 2.87 ppm, which are the signals originated from the vinylidene fluoride.

2-2. Inherent viscosity (ηi)

80 mg of each of the obtained (co)polymers was dissolved in 20 mL of n-methylpyrrolidone (NMP), and thus a (co)polymer solution was obtained. Using an Ubbelohde viscometer, the viscosity of the (co)polymer solution and the viscosity of the NMP in a thermostatic tank at 30° C. were measured, and the inherent viscosity was calculated based on the following equation.

$$\eta i = (1/C) \ln(\eta/\eta 0)$$

Note that η is the viscosity of the (co)polymer solution measured as described above, $\eta_0$ is the viscosity of the NMP measured as described above, C is the concentration of the (co)polymer in the (co)polymer solution and is 0.4 (g/dL) here.

2-3. IR Absorbance Ratio

Each of the vinylidene fluoride copolymer A-1 to the vinylidene fluoride copolymer A-5 was heat-pressed at 200° C. to form a 30 mm×30 mm film shape. Using the infrared spectrophotometer FT-IR 500 (available from JASCO Corporation), IR spectrum of each of the films was determined for the range from 1500 cm$^{-1}$ to 4000 cm$^{-1}$.

The $A_{NCO}$, which is a scale showing the amount of the isocyanate group present in the vinylidene fluoride copolymer A-1 to the vinylidene fluoride copolymer A-5, was determined by the following equation based on the absorbance originated from the isocyanate group detected around 2280 cm$^{-1}$ ($A_{2280}$) and the absorbance originated from the stretching vibration of C—H detected around 3023 cm$^{-1}$ ($A_{3023}$) in the IR spectrum.

$$A_{NCO} = A_{2280}/A_{3023}$$

3. Evaluation of Peel Strength 3-1. Example 1

In NMP, 99 parts by mass of LiNi$_{0.5}$Co$_{0.2}$Mn$_{0.3}$O$_2$ (NCM523; average particle size: 11 μm) as a positive electrode active material, 1 part by mass of Super-P (available from Timcal Japan; average particle size: 40 nm; specific surface area: 60 m$^2$/g) as an electrically conductive carbon black, and 2 parts by mass of the vinylidene fluoride copolymer A-1 as a binder resin were dispersed, and thus a positive electrode mixture in a slurry form was prepared.

The positive electrode mixture was coated on Al foil having a thickness of 15 μm by a bar coater, primarily dried at 110° C. for 30 minutes, and secondarily dried at 130° C. for 2 hours, and thus a one-side coated electrode having a one-side basis weight of 220 g/m$^2$ was produced.

The one-side coated electrode was cut to a length of 50 mm and a width of 20 mm, and a 90 degree peel test was conducted at a head speed of 10 mm/minute in accordance with JIS K 6854-1 using a tensile tester (Universal Testing Instrument Model: STA-1150, available from Orientec Co., Ltd.) to measure the peel strength.

3-2. Example 2

The peel strength was measured in the same manner as in Example 1 except for replacing the vinylidene fluoride copolymer A-1 with the vinylidene fluoride copolymer A-2.

3-3. Example 3

The peel strength was measured in the same manner as in Example 1 except for replacing the vinylidene fluoride copolymer A-1 with the vinylidene fluoride copolymer A-3.

3-4. Example 4

The peel strength was measured in the same manner as in Example 1 except for replacing the vinylidene fluoride copolymer A-1 with the vinylidene fluoride copolymer A-4 and changing the secondary drying temperature to 160° C.

3-5. Example 5

The peel strength was measured in the same manner as in Example 1 except for replacing the vinylidene fluoride copolymer A-1 with the vinylidene fluoride copolymer A-5 and changing the secondary drying temperature to 160° C.

3-6. Comparative Example 1

The peel strength was measured in the same manner as in Example 1 except for replacing the vinylidene fluoride copolymer A-1 with polyvinylidene fluoride having an inherent viscosity of 2.1 (KF #7200, available from Kureha Corporation; hereinafter, referred to as "vinylidene fluoride copolymer B-2").

3-7. Comparative Example 2

The peel strength was measured in the same manner as in Example 1 except for replacing the vinylidene fluoride copolymer A-1 with polyvinylidene fluoride having an inherent viscosity of 3.1 (KF #7300, available from Kureha Corporation; hereinafter, referred to as "vinylidene fluoride copolymer B-3").

3-8. Comparative Example 3

The peel strength was measured in the same manner as in Comparative Example 1 except for adding 0.0053 parts of hexamethylene diisocyanate (HDI, available from Tokyo Chemical Industry Co., Ltd.) as an additive containing an isocyanate group into the positive electrode mixture in a slurry form prepared in Comparative Example 1.

3-9. Comparative Example 4

The peel strength was measured in the same manner as in Comparative Example 1 except for adding 0.0053 parts of 2-isocyanatoethyl methacrylate (IEMA, available from Sigma-Aldrich) as an additive containing an isocyanate group into the positive electrode mixture in a slurry form prepared in Comparative Example 1.

3-10. Comparative Example 5

The peel strength was measured in the same manner as in Example 1 except for replacing the vinylidene fluoride copolymer A-1 with polyvinylidene fluoride having an inherent viscosity of 3.1 (KF #7300, available from Kureha Corporation) and changing the secondary drying temperature to 160° C.

3-11. Comparative Example 6

The peel strength was measured in the same manner as in Example 1 except for replacing the vinylidene fluoride copolymer A-1 with the vinylidene fluoride copolymer B-1 and adding 0.0053 parts of hexamethylene diisocyanate (HDI, available from Tokyo Chemical Industry Co., Ltd.) as an additive containing an isocyanate group into the prepared positive electrode mixture in a slurry form.

The types and physical properties of the (co)polymers used in Example 1 to Example 5 and Comparative Example 1 to Comparative Example 6, types of additives, and measured peel strengths are shown in Table 1.

TABLE 1

| (Co)polymer | | | | | | Additive Type | Peel strength (gf/mm) | Notes |
|---|---|---|---|---|---|---|---|---|
| Name | Monomer A | Monomer B | Monomer B constituent unit amount (mol %) | $\eta_i$ (dL/g) | $A_{NCO}$ | | | |
| A-1 | VDF | IEMA Graft polymerization | 0.087 | 1.6 | 0.31 | — | 6.8 | Example 1 |
| A-2 | VDF | IEMA Graft polymerization | 0.18 | 2.1 | 0.80 | — | 5.4 | Example 2 |
| A-3 | VDF | IEMA Graft polymerization | 0.486 | 1.7 | 1.96 | — | 5.1 | Example 3 |
| A-4 | VDF | MOI-BM | 0.13 | 2.8 | 0.14 | — | 6.8 | Example 4 |
| A-5 | VDF | MOI-BP | 0.15 | 2.9 | 0.17 | — | 4.9 | Example 5 |
| B-2 | VDF | — | — | 2.1 | No | — | 3.0 | Comparative Example 1 |
| B-3 | VDF | — | — | 3.1 | No | — | 3.7 | Comparative Example 2 |
| B-2 | VDF | — | — | 2.1 | No | HDI | 4.5 | Comparative Example 3 |
| B-2 | VDF | — | — | 2.1 | No | IEMA | 4.2 | Comparative Example 4 |

TABLE 1-continued

| | | | (Co)polymer | | | | | |
|---|---|---|---|---|---|---|---|---|
| Name | Monomer A | Monomer B | Monomer B constituent unit amount (mol %) | ηi (dL/g) | $A_{NCO}$ | Additive Type | Peel strength (gf/mm) | Notes |
| B-2 | VDF | — | — | 3.1 | No | — | 4.6 | Comparative Example 5 |
| B-1 | VDF | HEA | 0.087 | 1.6 | No | HDI | 4.6 | Comparative Example 6 |

As is clear from Table 1, the peel strength of each of the electrode mixture layer was increased by using the binder composition of a non-aqueous electrolyte secondary battery, the binder composition comprising the vinylidene fluoride copolymer containing the first constituent unit derived from vinylidene fluoride, and the second constituent unit containing an isocyanate group or having a structure that produces an isocyanate group when heated at 200° C. for 1 hour. From this result, it was confirmed that the binder composition containing the vinylidene fluoride copolymer can increase the adhesion of the electrode mixture layer to a surface of a current collector.

4. Gelling Time Evaluation of Stored Slurry 4-1. Example 11

In NMP, 100 parts by mass of $Li_{1.00}Ni_{0.85}Co_{0.15}Al_{0.05}O_2$ (NCA811; average particle size: 14.7 μm; specific surface area: 0.17 m$^2$/g) as a positive electrode active material, 2 parts by mass of Super-P (available from Timcal Japan) as an electrically conductive carbon black, and 2 parts by mass of the vinylidene fluoride copolymer A-5 as a binder resin were dispersed, and thus a positive electrode mixture in a slurry form was prepared.

The slurry viscosity of the positive electrode mixture was measured by an E-type viscometer at 25° C. with a shear rate of 2 s$^{-1}$. The viscosity was measured by charging the slurry into a measuring device, waiting for 60 seconds, and then rotating the rotor, and the value of the viscosity at 300 seconds after the start of the rotation of the rotor was used as the slurry viscosity.

While the positive electrode mixture in a slurry form was stored at 25° C. in a nitrogen atmosphere, the slurry viscosity was measured at given lengths of time (taking the start of storage as 0 hour, at 6 hour, 24 hours, 48 hours, 72 hours, and 144 hours, and after the 144 hours, every 24 hours up to 312 hours). When the slurry viscosity exceeded 100000 mPa·s, the positive electrode mixture was considered to be gelled, and the storage time at this time was used as the gelling time.

4-2. Example 12

The gelling time was measured in the same manner as in Example 11 except for replacing the vinylidene fluoride copolymer A-5 with the vinylidene fluoride copolymer A-4.

4-3. Example 13

The gelling time was measured in the same manner as in Example 11 except for heating the vinylidene fluoride copolymer A-5 in advance at 200° C. for 5 hours before being dispersed in the NMP.

4-4. Comparative Example 11

The gelling time was measured in the same manner as in Example 11 except for replacing the vinylidene fluoride copolymer A-5 with the vinylidene fluoride copolymer B-2.

The types of the vinylidene fluoride copolymers used in Example 11 to Example 13 and Comparative Example 11 and the measured gelling times are shown in Table 2.

TABLE 2

| Vinylidene fluoride copolymer | Gelling time (h) | Notes |
|---|---|---|
| A-5 | — (not gelled after 312 h) | Example 11 |
| A-4 | 48 | Example 12 |
| A-5 (heat treated) | 144 | Example 13 |
| B-2 | 24 | Comparative Example 11 |

As is clear from Table 2, the electrode mixture was less likely to be gelled even after the storage by using the binder composition of a non-aqueous electrolyte secondary battery, the binder composition comprising the vinylidene fluoride copolymer containing the first constituent unit derived from vinylidene fluoride, and the second constituent unit containing an isocyanate group or having a structure that produces an isocyanate group when heated at 200° C. for 1 hour. From this result, it was confirmed that a mixture for electrode production that is less likely to be gelled can be produced by the binder composition containing the vinylidene fluoride copolymer described above.

This application claims the benefit of JP 2018-047809, filed in Japan on Mar. 15, 2018, and the scope of patent claims and the specification of the application are hereby incorporated by reference.

INDUSTRIAL APPLICABILITY

Since the binder composition of a non-aqueous electrolyte secondary battery according to an embodiment of the present invention can enhance adhesion of the electrode mixture layer to a surface of a current collector, the binder composition can be suitably used for producing an electrode for a non-aqueous electrolyte secondary battery. Therefore, according to the present invention, by further enhancing cycle characteristics of a non-aqueous electrolyte secondary battery, contribution to development and popularization of the technologies of the same field is expected.

Note that the vinylidene fluoride copolymer contained in the binder composition according to an embodiment of the present invention can be used in various use where vinylidene fluoride polymers have been usually used, such as pipes, fishing line, and strings of stringed instruments. Furthermore, the vinylidene fluoride copolymer contained in the binder composition according to an embodiment of the present invention has a high adhesion to a metal surface, and thus can be used in various use where adhesion to a metal surface is required.

The invention claimed is:

1. A binder composition of a non-aqueous electrolyte secondary battery, the binder composition comprising a vinylidene fluoride copolymer containing:
   a first constituent unit derived from vinylidene fluoride, and
   a second constituent unit containing an isocyanate group or having a structure that produces an isocyanate group when heated at 200° C. for 1 hour;
   the vinylidene fluoride copolymer being a copolymer having a ratio of an absorbance originated from stretching vibration of an isocyanate group to an absorbance originated from stretching vibration of C—H from 0.10 to 30, as calculated from infrared spectrum (IR spectrum) obtained by measuring the vinylidene fluoride copolymer after the vinylidene fluoride copolymer is heated at 200° C. for 1 hour.

2. The binder composition according to claim 1, wherein the vinylidene fluoride copolymer is a copolymer having the second constituent unit having a structure derived from a monomer represented by General Formula (1):

[Chemical Formula 1]

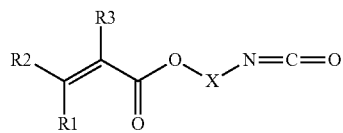

General Formula (1)

where, R1, R2, and R3 each independently represent a hydrogen atom, a fluorine atom, a chlorine atom, or a linear or branched alkyl group having from 1 to 5 carbons that may be at least partially substituted with a fluorine atom or a chlorine atom, and X represents an atomic group having a total number of carbon atoms and oxygen atoms from 1 to 18 and a molecular weight of 458 or less.

3. The binder composition according to claim 1, wherein the vinylidene fluoride copolymer is a copolymer having the second constituent unit having a structure derived from a monomer represented by General Formula (2):

[Chemical Formula 2]

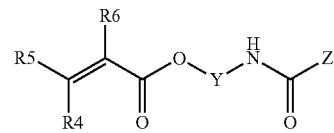

General Formula (2)

where, R4, R5, and R6 each independently represent a hydrogen atom, a fluorine atom, a chlorine atom, or a linear or branched alkyl group having from 1 to 5 carbons that may be at least partially substituted with a fluorine atom or a chlorine atom, Y represents an atomic group having a total number of carbon atoms and oxygen atoms from 1 to 18 and a molecular weight of 458 or less, and Z represents an atomic group containing an atom selected from the group consisting of an oxygen atom, a sulfur atom, and a nitrogen atom and having a molecular weight of 200 or less, and represents a structure that produces an isocyanato group by dissociation of Z.

4. The binder composition according to claim 1, wherein the vinylidene fluoride copolymer is a copolymer in which a content of the second constituent unit is from 0.01 mol % to 10 mol % when a total amount of the first constituent unit and the second constituent unit is 100 mol %.

5. The binder composition according to claim 1, wherein the vinylidene fluoride copolymer is a copolymer having an inherent viscosity from 0.5 dL/g to 5.0 dL/g.

6. A mixture for producing an electrode for a non-aqueous electrolyte secondary battery comprising: the binder composition described in claim 1, and an electrode active material.

7. An electrode for a non-aqueous electrolyte secondary battery comprising: a current collector, and an electrode mixture layer formed on a surface of the current collector;
   the electrode mixture layer containing the binder composition described in claim 1, and an electrode active material.

8. A non-aqueous electrolyte secondary battery comprising the electrode for a non-aqueous electrolyte secondary battery described in claim 7.

* * * * *